(12) United States Patent
Huang et al.

(10) Patent No.: US 10,869,011 B1
(45) Date of Patent: Dec. 15, 2020

(54) BLIND LEGACY VIDEO ARTIFACT REDUCTION

(71) Applicant: SONY CORPORATION, Tokyo (JP)

(72) Inventors: Ko-Kai Albert Huang, Cupertino, CA (US); Ming-Chang Liu, San Jose, CA (US)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 16/587,558

(22) Filed: Sep. 30, 2019

(51) Int. Cl.
| | | |
|---|---|---|
| *H04N 9/79* | (2006.01) | |
| *H04N 9/64* | (2006.01) | |
| *H04N 7/01* | (2006.01) | |
| *H04N 5/911* | (2006.01) | |
| *H04N 5/21* | (2006.01) | |

(52) U.S. Cl.
CPC .......... *H04N 9/7908* (2013.01); *H04N 5/211* (2013.01); *H04N 5/911* (2013.01); *H04N 7/0135* (2013.01); *H04N 9/646* (2013.01)

(58) Field of Classification Search
CPC ...... H04N 9/7908; H04N 9/646; H04N 5/211; H04N 5/911; H04N 7/0135
See application file for complete search history.

(56) References Cited

U.S. PATENT DOCUMENTS

| | | | |
|---|---|---|---|
| 4,672,445 A * | 6/1987 | Casey ................... | H04N 5/144 348/450 |
| 5,161,006 A | 11/1992 | Monta et al. | |
| 7,327,405 B1 * | 2/2008 | Lowe ...................... | H04N 9/78 348/663 |
| 2012/0093433 A1 * | 4/2012 | Gupta ..................... | G06T 5/007 382/260 |
| 2016/0065795 A1 * | 3/2016 | Baqai ..................... | G06T 5/002 348/241 |

FOREIGN PATENT DOCUMENTS

| | | |
|---|---|---|
| CN | 101902653 B | 4/2013 |
| DE | 19519949 C1 | 6/1995 |
| WO | 94/08426 | 4/1994 |

* cited by examiner

*Primary Examiner* — Michael E Teitelbaum
(74) *Attorney, Agent, or Firm* — Haverstock & Owens LLP

(57) ABSTRACT

Blind legacy video artifact reduction reduces ghost artifacts and Y/C artifacts. Ghost artifacts are reduced using edge correlation and an IIR filter. Y/C artifacts are reduced using frequency domain filtering. The result is much cleaner video content.

15 Claims, 12 Drawing Sheets

BLIND LEGACY VIDEO ARTIFACT REDUCTION

FIELD OF THE INVENTION

The present invention relates to analog television broadcasts. More specifically, the present invention relates to reducing analog artifacts in analog television broadcasts.

BACKGROUND OF THE INVENTION

Over-the-air analog encoding results in ghost artifacts and Y/C artifacts. Luma (Y) and chroma (C) signals are interleaved in high frequency and are hard to separate. A striping artifact develops due to badly separated Y/C. A hanging dots artifact develops due to edge color changes. Ghosts are attenuated copies of original signals that are superimposed on the original signals.

SUMMARY OF THE INVENTION

Blind legacy video artifact reduction reduces ghost artifacts and Y/C artifacts. Ghost artifacts are reduced using edge correlation and an IIR filter. Y/C artifacts are reduced using frequency domain filtering. The result is much cleaner video content.

In one aspect, a method programmed in a non-transitory memory of a device comprises receiving a video signal, performing Y/C artifact reduction on the video signal to generate an improved video signal and performing ghost artifact reduction on the video signal to generate the improved video signal. Performing Y/C artifact reduction on the video signal includes utilizing a notch filter to target specific spike locations in the video signal. Performing Y/C artifact reduction on the video signal includes utilizing adaptive frequency suppression to adaptively locate a minimum cutoff frequency by curve fitting and attenuate related frequency components to a lower magnitude. Performing ghost artifact reduction on the video signal includes determining locations and magnitudes of pre-ghosts and post-ghosts. Performing ghost artifact reduction on the video signal includes edge correlation. Performing ghost artifact reduction on the video signal utilizes an infinite impulse response filter. Performing ghost artifact reduction on the video signal includes spline interpolation for subpixel accuracy.

In another aspect, an apparatus comprises a non-transitory memory for storing an application, the application for: receiving a video signal, performing Y/C artifact reduction on the video signal to generate an improved video signal and performing ghost artifact reduction on the video signal to generate the improved video signal and a processor coupled to the memory, the processor configured for processing the application. Performing Y/C artifact reduction on the video signal includes utilizing a notch filter to target specific spike locations in the video signal. Performing Y/C artifact reduction on the video signal includes utilizing adaptive frequency suppression to adaptively locate a minimum cutoff frequency by curve fitting and attenuate related frequency components to a lower magnitude. Performing ghost artifact reduction on the video signal includes determining locations and magnitudes of pre-ghosts and post-ghosts. Performing ghost artifact reduction on the video signal includes edge correlation. Performing ghost artifact reduction on the video signal utilizes an infinite impulse response filter. Performing ghost artifact reduction on the video signal includes spline interpolation for subpixel accuracy.

In another aspect, a system comprises one or more devices for receiving a video signal and one or more filters for: performing Y/C artifact reduction on the video signal to generate an improved video signal and performing ghost artifact reduction on the video signal to generate the improved video signal. Performing Y/C artifact reduction on the video signal includes utilizing a notch filter to target specific spike locations in the video signal. Performing Y/C artifact reduction on the video signal includes utilizing adaptive frequency suppression to adaptively locate a minimum cutoff frequency by curve fitting and attenuate related frequency components to a lower magnitude. Performing ghost artifact reduction on the video signal includes determining locations and magnitudes of pre-ghosts and post-ghosts. Performing ghost artifact reduction on the video signal includes edge correlation. Performing ghost artifact reduction on the video signal utilizes an infinite impulse response filter. Performing ghost artifact reduction on the video signal includes spline interpolation for subpixel accuracy.

DETAILED DESCRIPTION OF THE PREFERRED EMBODIMENT

Figure 1:
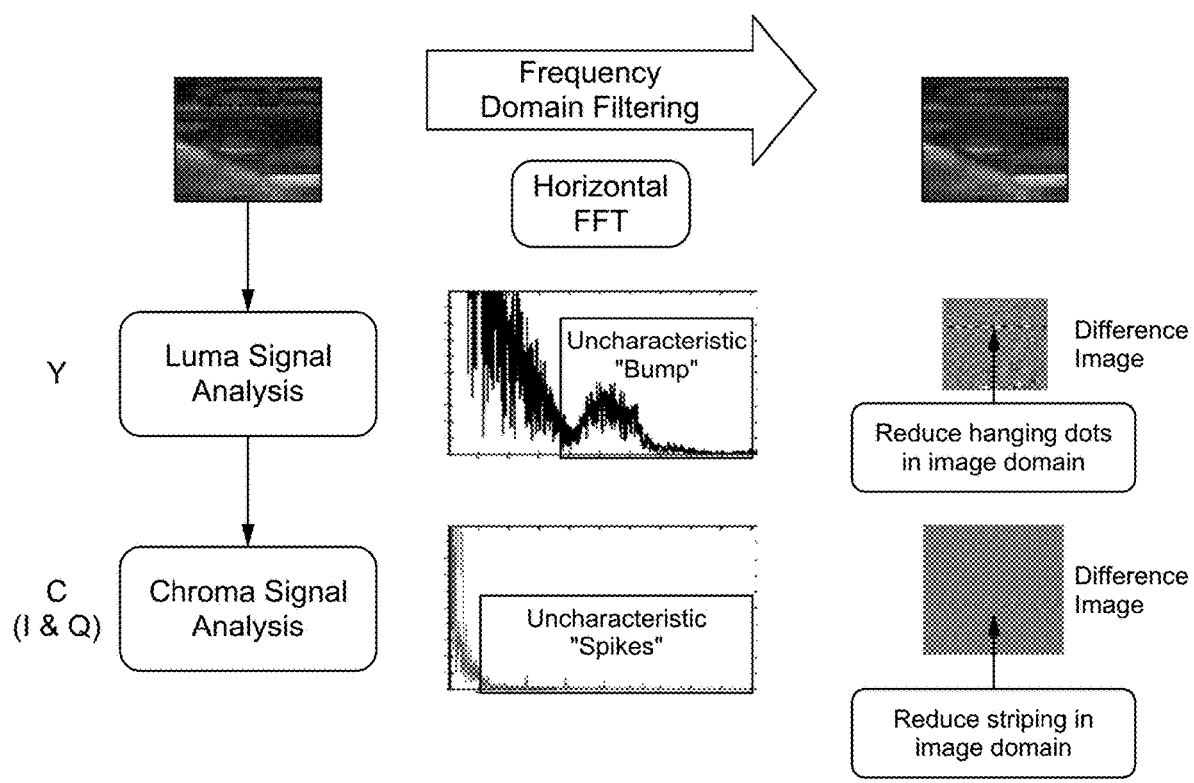
FIG. 1 illustrates a diagram of Y/C artifact reduction by frequency domain filtering according to some embodiments.

FIG. 1 illustrates a diagram of Y/C artifact reduction by frequency domain filtering according to some embodiments. The Y signal (also referred to as the intensity signal or luma signal) and the C signal (also referred to as the color signal or chroma signal) are analyzed in the frequency domain. Specifically, a horizontal Fast Fourier Transform (FFT) is applied to perform frequency domain filtering on the signals. For example, a bump in the Y signal is able to be filtered out (e.g., by the FFT) to reduce hanging dots in the image domain. Spikes in the C signal are able to be filtered out to reduce striping in the image domain.

Figure 2:
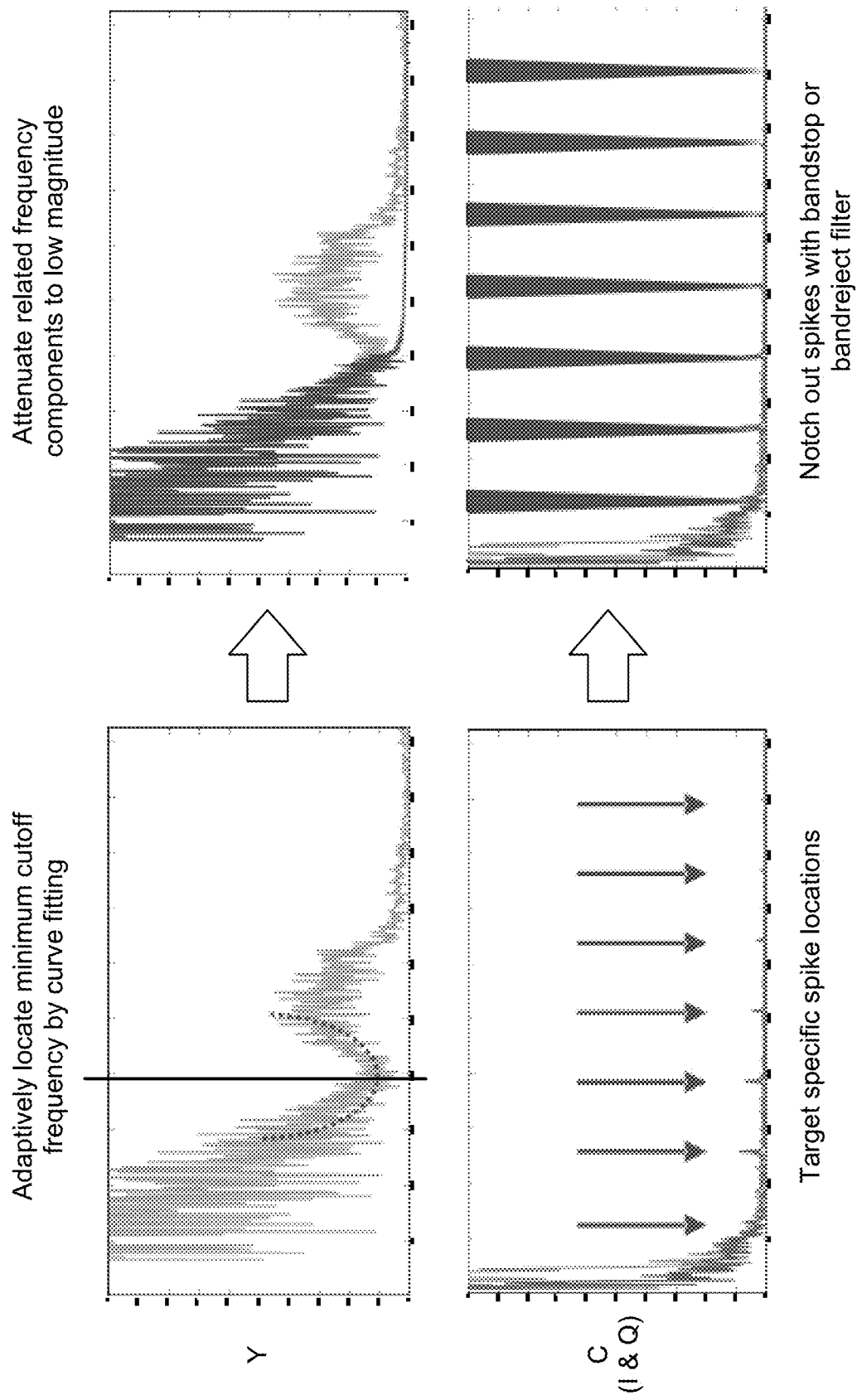
FIG. 2 illustrates examples of frequency domain filtering according to some embodiments.

FIG. 2 illustrates examples of frequency domain filtering according to some embodiments. For Y, a minimum cutoff frequency is adaptively located by curve fitting. The goal is to suppress the bump. Related frequency components are able to be attenuated to a low magnitude. For C, specific spike locations are targeted. The spikes are able to be notched out with bandstop or bandreject filters.

Figure 3:
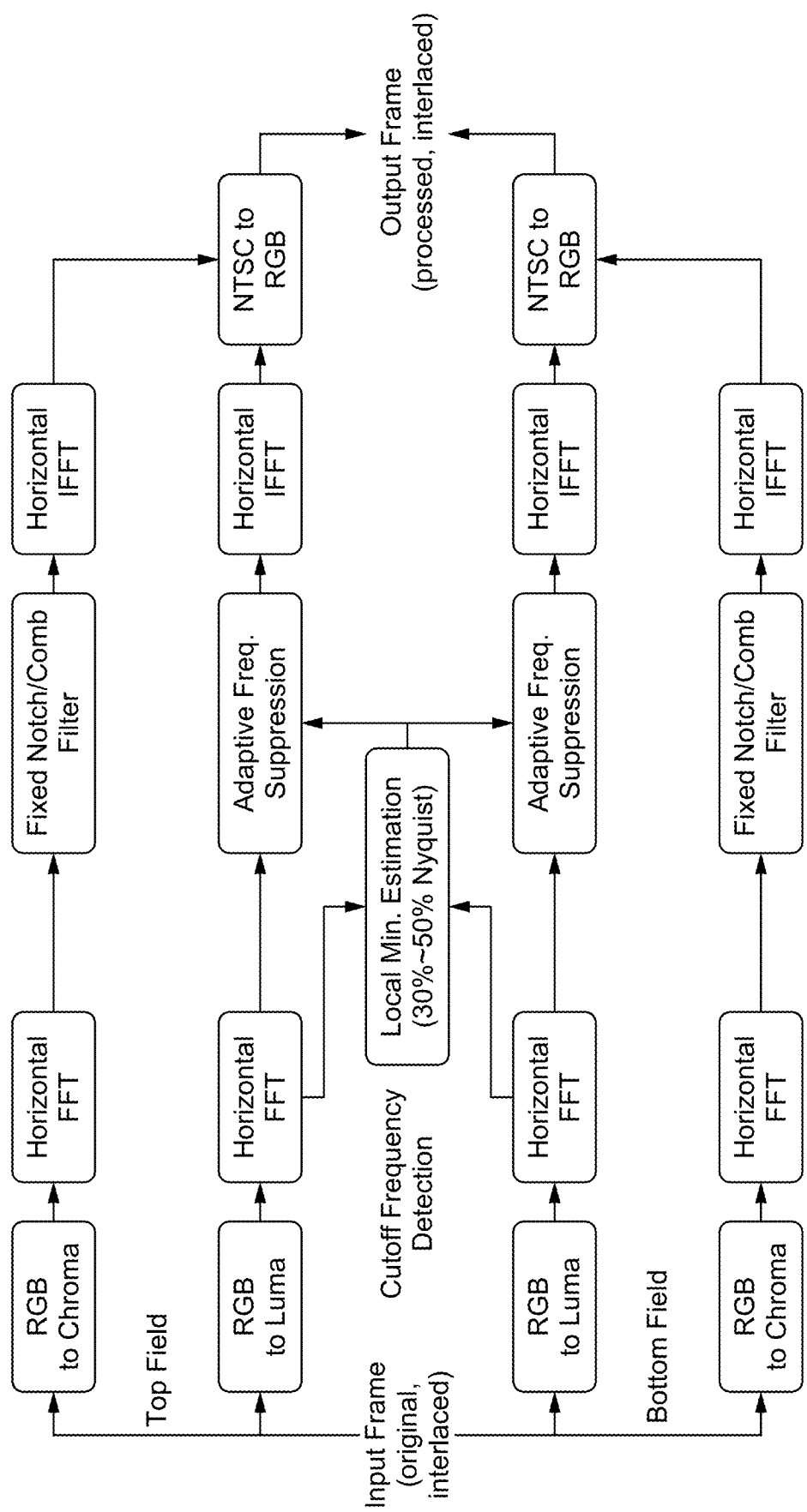
FIG. 3 illustrates a Y/C artifact reduction framework (interlaced) according to some embodiments.

FIG. 3 illustrates a Y/C artifact reduction framework (interlaced) according to some embodiments. If the video is interlaced, then the video is able to be separated into a top field and a bottom field (e.g., odd lines and even lines). Each field is able to be processed and then re-combined. For example, for each field, there is a conversion from RGB to chroma and RGB to luma. The chroma and luma signals are transformed (e.g., using a horizontal FFT). Then, the fixed notch/comb filter is applied to the chroma signal, and an adaptive frequency suppression is applied to the luma signal. In some embodiments, before the adaptive frequency suppression, a local minimum estimation (30%~50% Nyquist) is performed. After the notch/comb filter or adaptive frequency suppression, a horizontal inverse FFT (IFFT) is applied. Then conversion of the National Television System Committee (NTSC) values to RGB color space is performed. Ultimately, an output frame is processed, interlaced by combining the top field and bottom field results.

Figure 4:
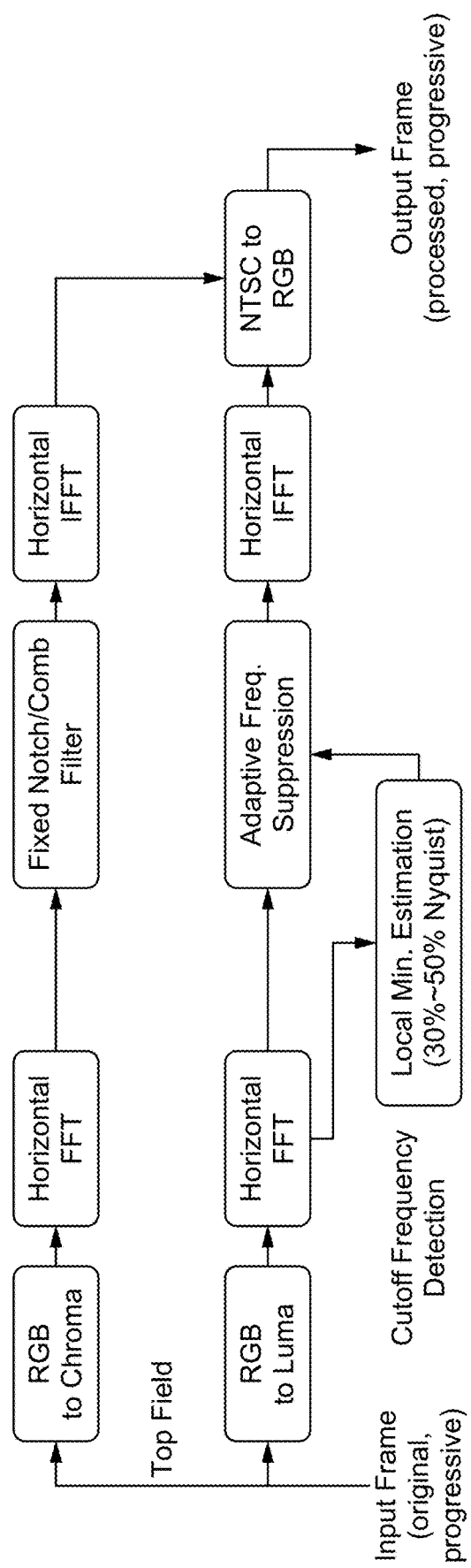
FIG. 4 illustrates a Y/C artifact reduction framework (progressive) according to some embodiments.

FIG. 4 illustrates a Y/C artifact reduction framework (progressive) according to some embodiments. If the video is progressive, then the video is one frame. For a frame, there is a conversion from RGB to chroma and RGB to luma. The chroma and luma signals are transformed (e.g., using a horizontal FFT). Then, the fixed notch/comb filter is applied to the chroma signal, and an adaptive frequency suppression is applied to the luma signal. In some embodiments, before the adaptive frequency suppression, a local minimum estimation (30% 50% Nyquist) is performed. After the notch/comb filter or adaptive frequency suppression, a horizontal inverse FFT (IFFT) is applied. Then conversion of the NTSC values to RGB color space is performed. Ultimately, a progressive output frame results.

Figure 5:
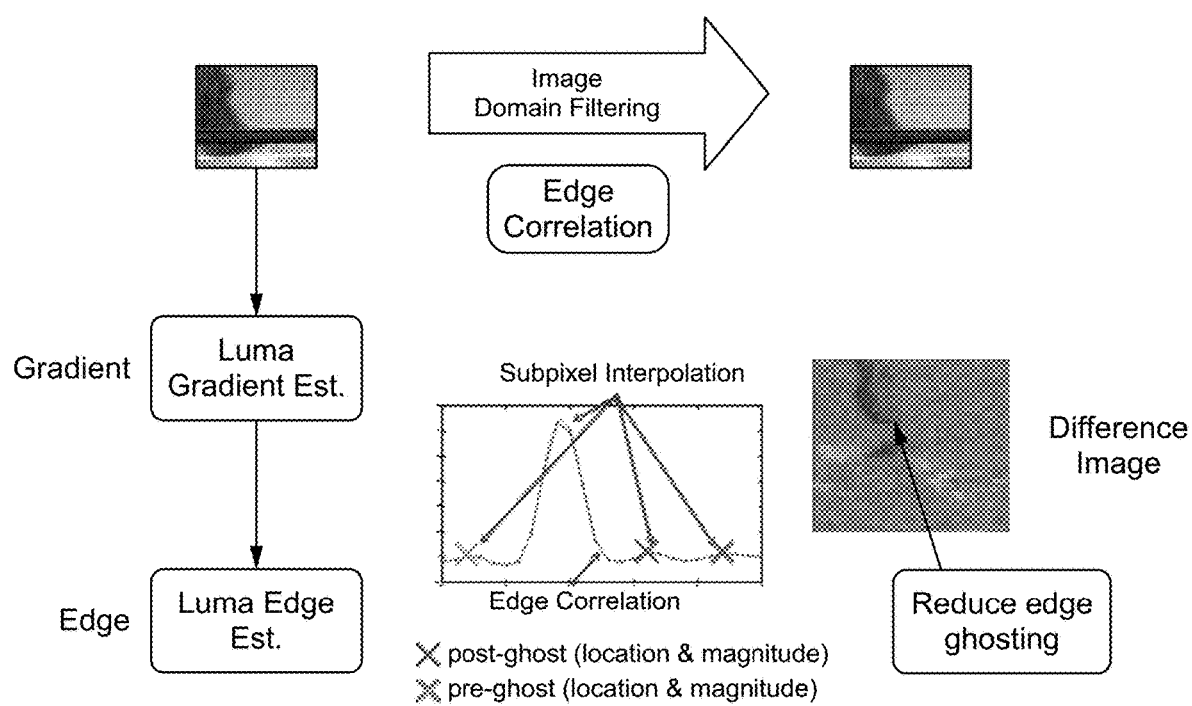
FIG. 5 illustrates a diagram of ghost artifact reduction by edge correlation according to some embodiments.

FIG. 5 illustrates a diagram of ghost artifact reduction by edge correlation according to some embodiments. The intensity image and edge information are analyzed. Edge information analysis includes edge correlation which involves determining the main edge (e.g., large bump in the signal) and pre-ghost and post-ghost edges (e.g., the small bumps in the signal). The location and magnitude of the pre-ghost and post-ghost edges are determined. The pre-ghost and post-ghost edges are able to be reduced in any manner such as by filtering the edges (e.g., minimizing values below a point on the large bump/peak).

Figure 6:
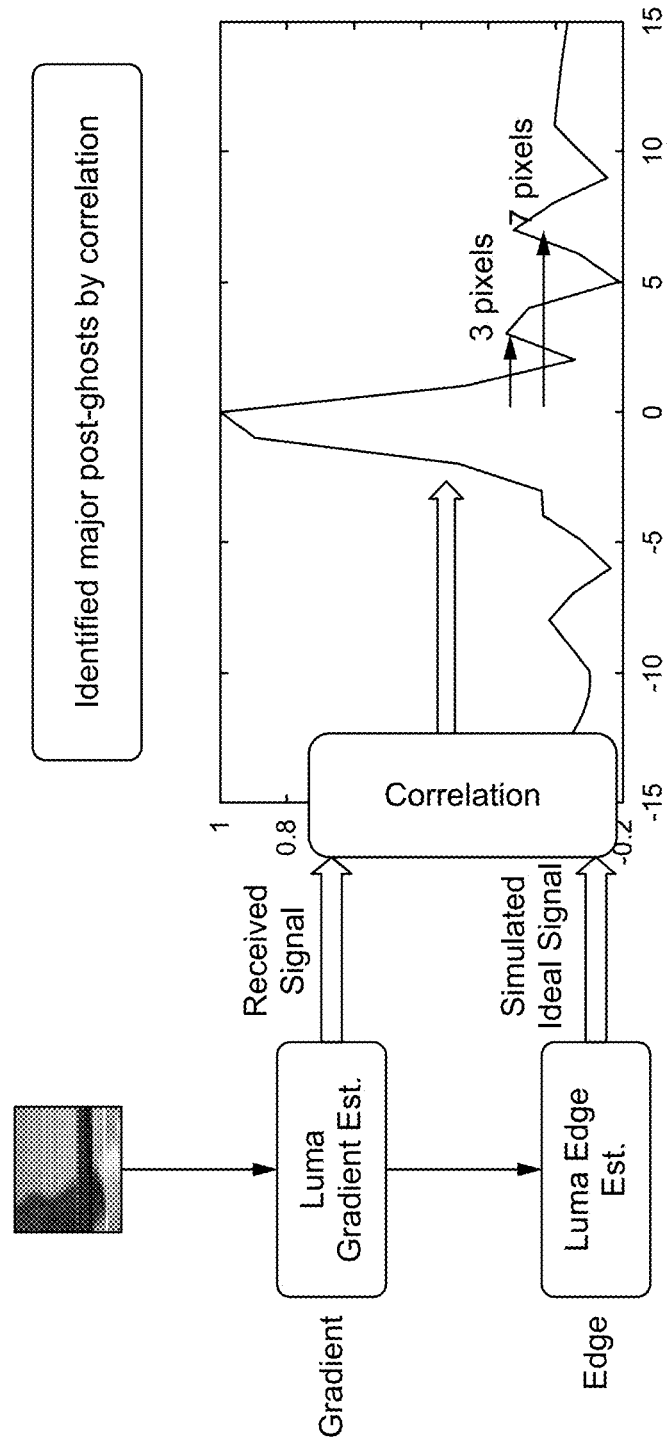
FIG. 6 illustrates ghost detection by edge correlation according to some embodiments.
Figure 7:
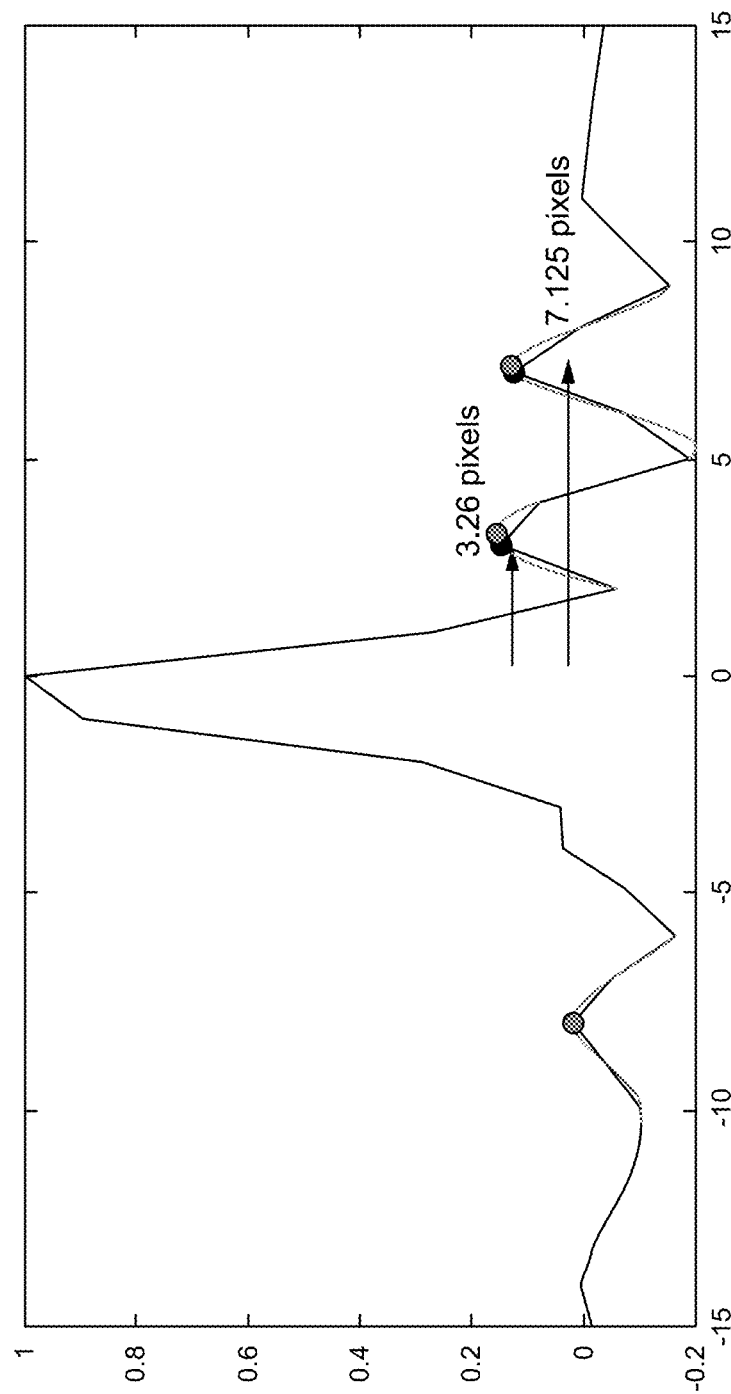
FIG. 7 illustrates a diagram of interpolating the correlation to obtain more accurate sub-pixel information about the ghost positions according to some embodiments.

FIG. 6 illustrates ghost detection by edge correlation according to some embodiments. From the image, an image gradient is derived, which is akin to the received signal in the traditional ghost cancellation. An edge detector is used to detect major edges (e.g., edges above a threshold) which gives the simulated ideal signal. By comparing the received signal and the simulated ideal signal, peaks are able to be determined such as the main peak (the main edge/signal) and the secondary peaks (the ghost edges), including the locations of the peaks (e.g., how many pixels away from the main peak) and the magnitudes of the peaks (e.g., percentage of the main peak). From that information, it is possible to further interpolate the correlation to obtain more accurate sub-pixel information about the ghost positions as shown in FIG. 7.

Figure 8:
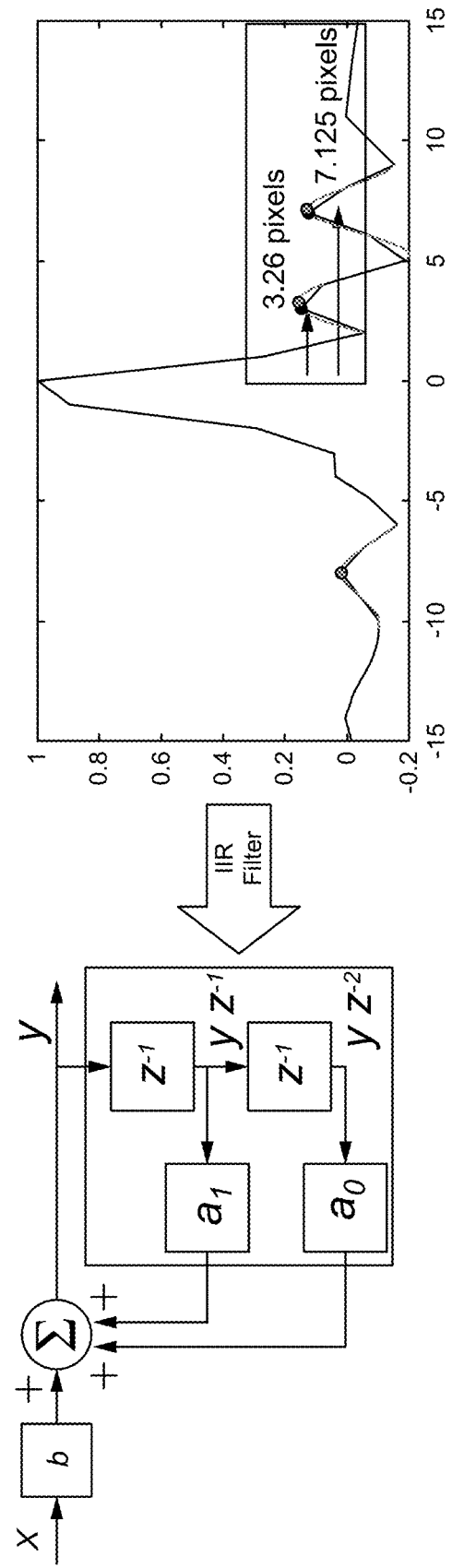
FIG. 8 illustrates a diagram of ghost reduction with an IIR filter according to some embodiments.

FIG. 8 illustrates a diagram of ghost reduction with an IIR filter according to some embodiments. With the ghost position information, an IIR filter is able to be implemented. An input x is received at the IIR filter, and output y exits the filter. The filter includes $z^{-1}$ or $z^{-2}$ depending on how many taps in the filter. The filter also includes an amplitude factor ($a_1$ or $a_0$) that multiplies the time-delay signal by the factor and adds it back to the input signal to get the filtered output y. For example, if a peak is 3 pixels away and another peak is 7 pixels away, one of the z's will be delayed by 3 pixels and one will be delayed by 7 pixels, and $a_1$ and $a_0$ will be the corresponding signal amplitude, which is approximately 0.2, and then that signal is subtracted from the input signal, which helps recover the main signal.

Figure 9:
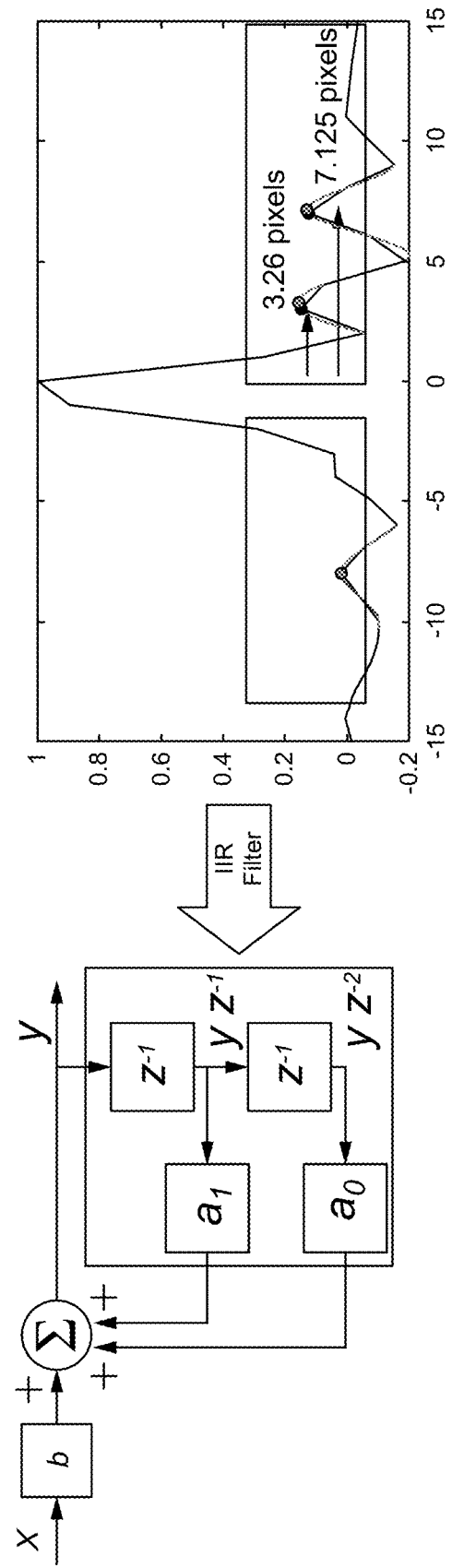
FIG. 9 illustrates a diagram of ghost reduction with an IIR filter according to some embodiments.

FIG. 9 illustrates a diagram of ghost reduction with an IIR filter according to some embodiments. A similar filter is applied in the reverse direction for pre-ghost reduction.

Figure 10:
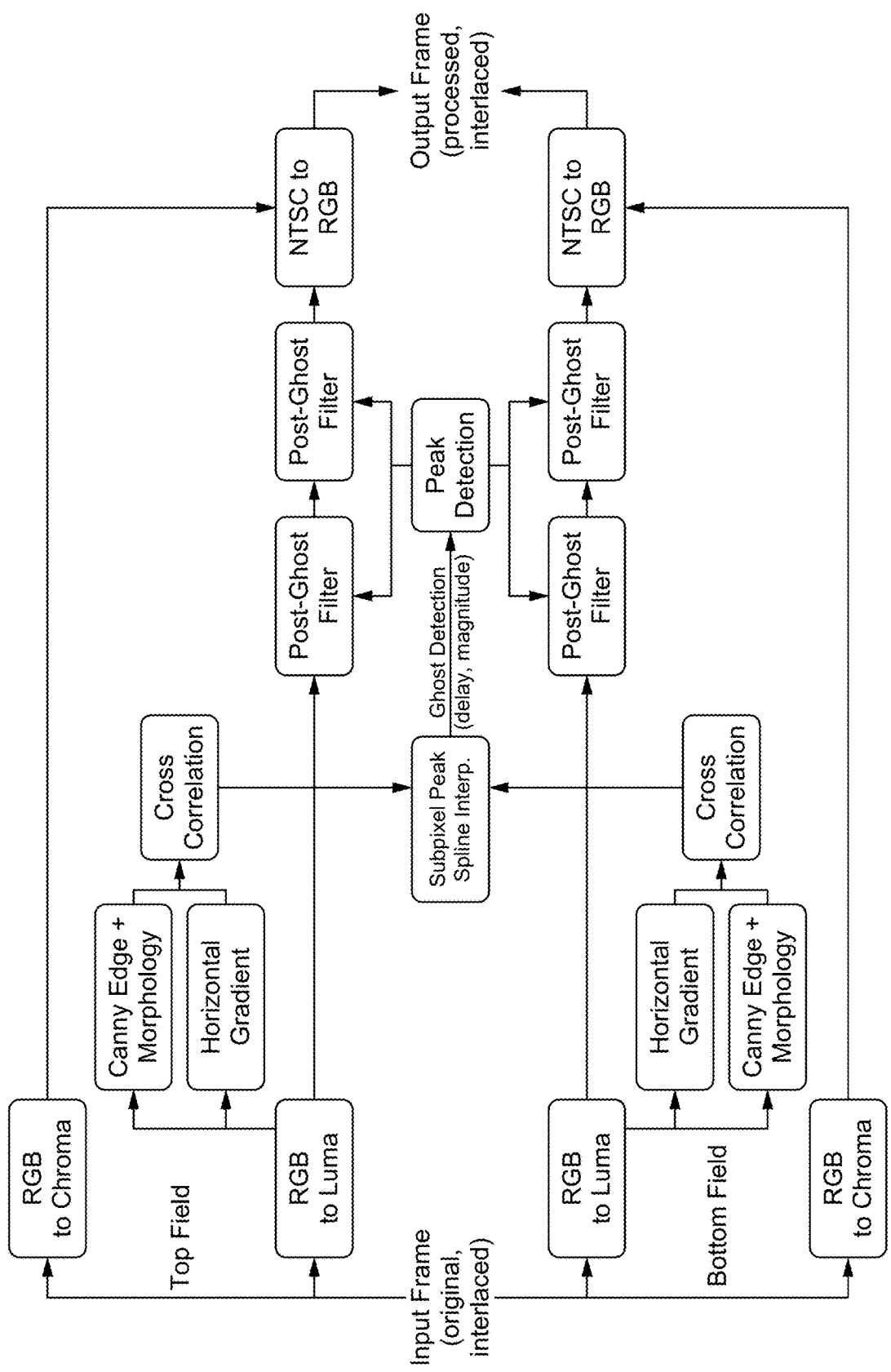
FIG. 10 illustrates a diagram of ghost artifact reduction framework (interlaced) according to some embodiments.

FIG. 10 illustrates a diagram of ghost artifact reduction framework (interlaced) according to some embodiments. If the video is interlaced, then the video is able to be separated into a top field and a bottom field (e.g., odd lines and even lines). Each field is able to be processed and then re-combined. For example, for each field, there is a conversion from RGB to chroma and RGB to luma. During or after the RGB to luma conversion, canny edge and morphology are implemented, and a horizontal gradient is determined to perform cross correlation which is used to perform subpixel peak spline interpolation (e.g., ghost detection including delay and magnitude). Peak detection is then performed which is used for the post-ghost and pre-ghost filters. Then conversion of the NTSC values to RGB color space is performed. Ultimately, an output frame is processed, interlaced by combining the top field and bottom field results.

Figure 11:
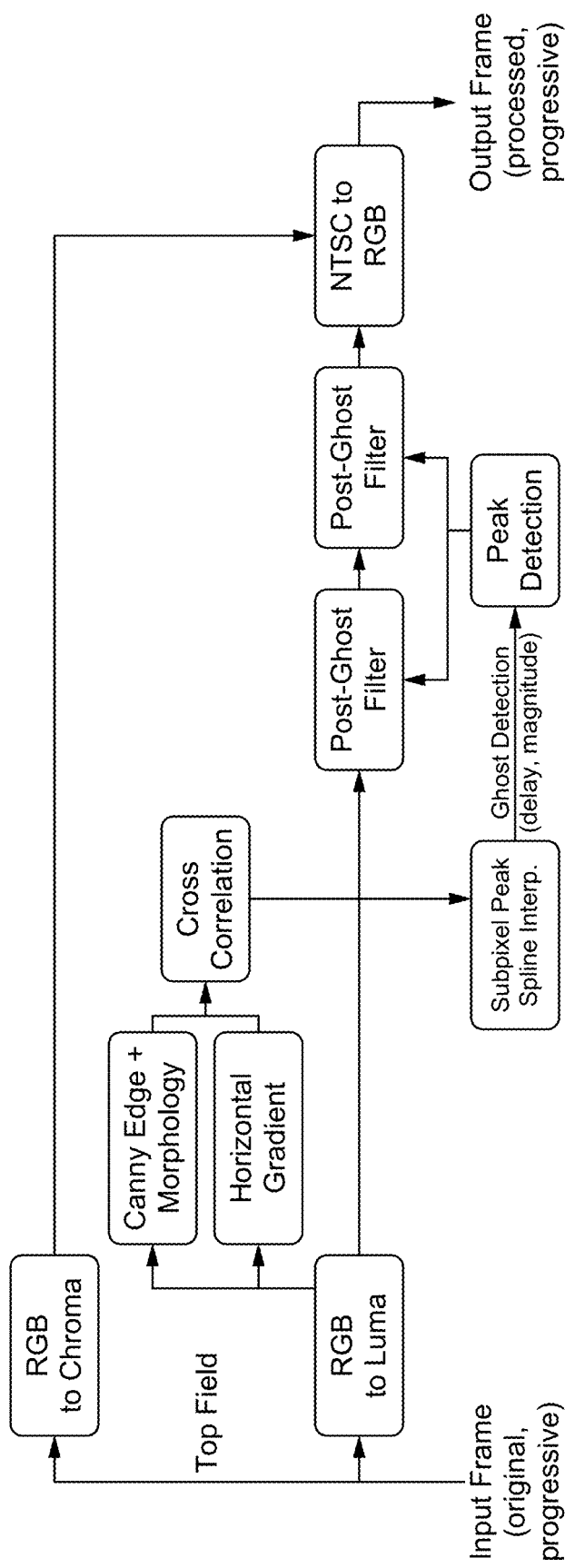
FIG. 11 illustrates a diagram of ghost artifact reduction framework (progressive) according to some embodiments.

FIG. 11 illustrates a diagram of ghost artifact reduction framework (progressive) according to some embodiments. If the video is progressive, then the video is one frame. For a frame, there is a conversion from RGB to chroma and RGB to luma. During or after the RGB to luma conversion, canny edge and morphology are implemented, and a horizontal gradient is determined to perform cross correlation which is used to perform subpixel peak spline interpolation (e.g., ghost detection including delay and magnitude). Peak detection is then performed which is used for the post-ghost and pre-ghost filters. Then conversion of the NTSC values to RGB color space performed. Ultimately, an output frame is processed, interlaced by combining the top field and bottom field results.

In some embodiments, Y/C artifact reduction and ghost reduction are performed serially (e.g., Y/C artifact reduction first and then ghost reduction). In some embodiments, Y/C artifact reduction and ghost reduction are performed in parallel.

Figure 12:
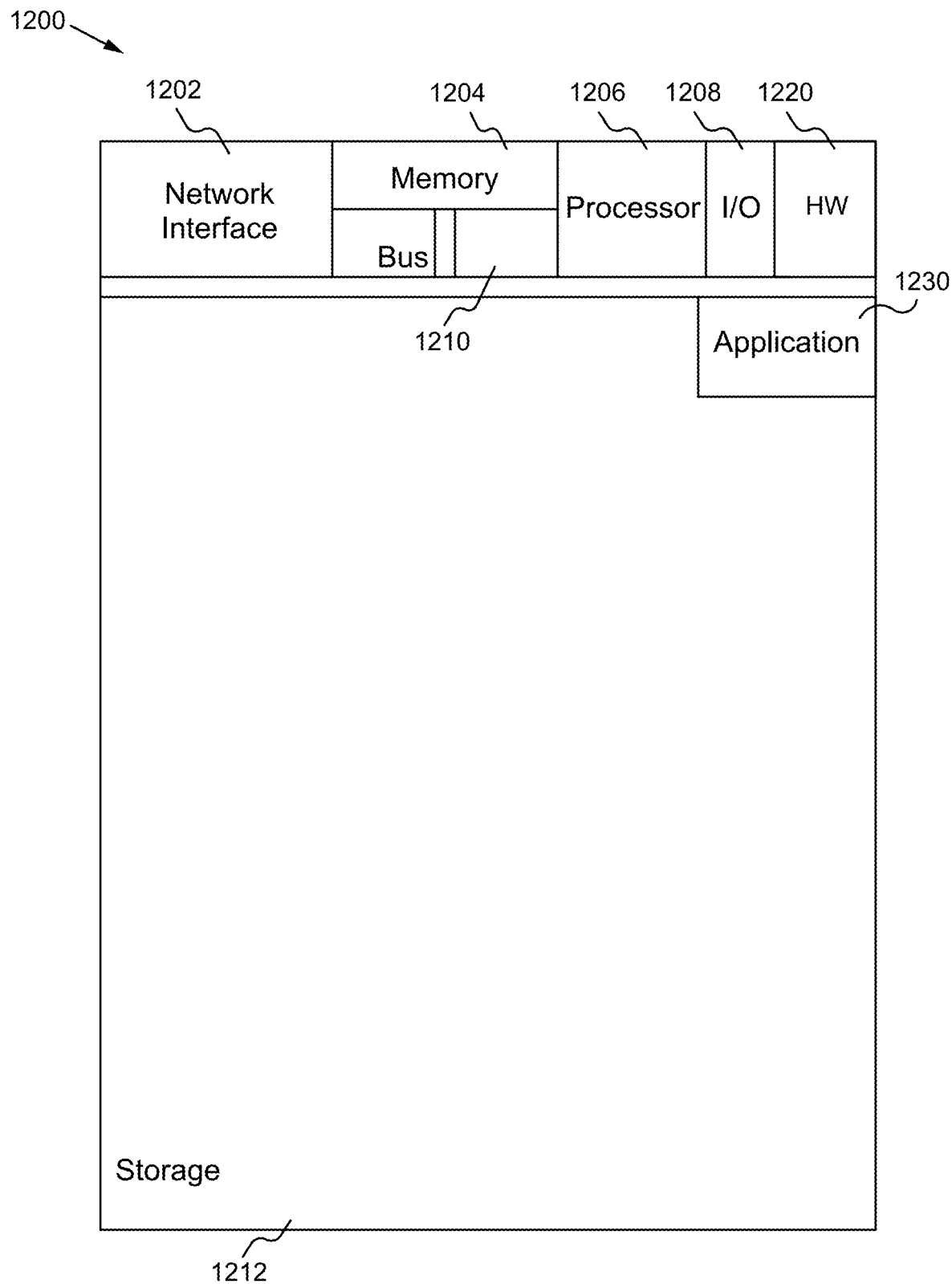
FIG. 12 illustrates a block diagram of an exemplary computing device configured to implement the video artifact reduction method according to some embodiments.

FIG. 12 illustrates a block diagram of an exemplary computing device configured to implement the video artifact reduction method according to some embodiments. The computing device 1200 is able to be used to acquire, store, compute, process, communicate and/or display information such as images and videos including 3D content. The computing device 1200 is able to implement any of the video artifact reduction aspects. In general, a hardware structure suitable for implementing the computing device 1200 includes a network interface 1202, a memory 1204, a processor 1206, I/O device(s) 1208, a bus 1210 and a storage device 1212. The choice of processor is not critical as long as a suitable processor with sufficient speed is chosen. The memory 1204 is able to be any conventional computer memory known in the art. The storage device 1212 is able to include a hard drive, CDROM, CDRW, DVD, DVDRW, High Definition disc/drive, ultra-HD drive, flash memory card or any other storage device. The computing device 1200 is able to include one or more network interfaces 1202. An example of a network interface includes a network card connected to an Ethernet or other type of LAN. The I/O device(s) 1208 are able to include one or more of the following: keyboard, mouse, monitor, screen, printer, modem, touchscreen, button interface and other devices. Video artifact reduction application(s) 1230 used to implement the video artifact reduction method are likely to be stored in the storage device 1212 and memory 1204 and processed as applications are typically processed. More or fewer components shown in FIG. 12 are able to be included in the computing device 1200. In some embodiments, video artifact reduction hardware 1220 is included. Although the computing device 1200 in FIG. 12 includes applications 1230 and hardware 1220 for the video artifact reduction method, the video artifact reduction method is able to be implemented on a computing device in hardware, firmware, software or any combination thereof. For example, in some embodiments, the video artifact reduction applications 1230 are programmed in a memory and executed using a processor. In another example, in some embodiments, the video artifact reduction hardware 1220 is programmed hardware logic including gates specifically designed to implement the video artifact reduction method.

In some embodiments, the video artifact reduction application(s) 1230 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the video artifact reduction method, a device acquires or receives content and processes and/or sends the content in an optimized manner to enable proper display of the content. The video artifact reduction method is able to be implemented with user assistance or automatically without user involvement.

In operation, the video artifact reduction method removes/reduces ghost artifacts and Y/C artifacts providing higher quality video content.

Some Embodiments of Blind Legacy Video Artifact Reduction

1. A method programmed in a non-transitory memory of a device comprising: receiving a video signal;
   performing Y/C artifact reduction on the video signal to generate an improved video signal; and
   performing ghost artifact reduction on the video signal to generate the improved video signal.
2. The method of clause 1 wherein performing Y/C artifact reduction on the video signal includes utilizing a notch filter to target specific spike locations in the video signal.
3. The method of clause 1 wherein performing Y/C artifact reduction on the video signal includes utilizing adaptive frequency suppression to adaptively locate a minimum cutoff frequency by curve fitting and attenuate related frequency components to a lower magnitude.
4. The method of clause 1 wherein performing ghost artifact reduction on the video signal includes determining locations and magnitudes of pre-ghosts and post-ghosts.
5. The method of clause 4 wherein performing ghost artifact reduction on the video signal includes edge correlation.
6. The method of clause 1 wherein performing ghost artifact reduction on the video signal utilizes an infinite impulse response filter.
7. The method of clause 1 wherein performing ghost artifact reduction on the video signal includes spline interpolation for subpixel accuracy.
8. An apparatus comprising:
   a non-transitory memory for storing an application, the application for:
     receiving a video signal;
     performing Y/C artifact reduction on the video signal to generate an improved video signal; and
     performing ghost artifact reduction on the video signal to generate the improved video signal; and
   a processor coupled to the memory, the processor configured for processing the application.
9. The apparatus of clause 8 wherein performing Y/C artifact reduction on the video signal includes utilizing a notch filter to target specific spike locations in the video signal.
10. The apparatus of clause 8 wherein performing Y/C artifact reduction on the video signal includes utilizing adaptive frequency suppression to adaptively locate a minimum cutoff frequency by curve fitting and attenuate related frequency components to a lower magnitude.
11. The apparatus of clause 8 wherein performing ghost artifact reduction on the video signal includes determining locations and magnitudes of pre-ghosts and post-ghosts.
12. The apparatus of clause 11 wherein performing ghost artifact reduction on the video signal includes edge correlation.
13. The apparatus of clause 8 wherein performing ghost artifact reduction on the video signal utilizes an infinite impulse response filter.
14. The apparatus of clause 8 wherein performing ghost artifact reduction on the video signal includes spline interpolation for subpixel accuracy.
15. A system comprising:
    one or more devices for receiving a video signal; and
    one or more filters for:
      performing Y/C artifact reduction on the video signal to generate an improved video signal; and
      performing ghost artifact reduction on the video signal to generate the improved video signal.
16. The system of clause 15 wherein performing Y/C artifact reduction on the video signal includes utilizing a notch filter to target specific spike locations in the video signal.
17. The system of clause 15 wherein performing Y/C artifact reduction on the video signal includes utilizing adaptive frequency suppression to adaptively locate a minimum cutoff frequency by curve fitting and attenuate related frequency components to a lower magnitude.
18. The system of clause 15 wherein performing ghost artifact reduction on the video signal includes determining locations and magnitudes of pre-ghosts and post-ghosts.
19. The system of clause 18 wherein performing ghost artifact reduction on the video signal includes edge correlation.
20. The system of clause 15 wherein performing ghost artifact reduction on the video signal utilizes an infinite impulse response filter.

21. The system of clause 15 wherein performing ghost artifact reduction on the video signal includes spline interpolation for subpixel accuracy.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
   receiving a video signal;
   performing Y/C artifact reduction on the video signal to generate an improved video signal, wherein performing Y/C artifact reduction on the video signal includes utilizing a notch filter on the chroma signal of the video signal to target specific spike locations in the video signal, wherein performing Y/C artifact reduction on the video signal includes utilizing adaptive frequency suppression on the luma signal of the video signal to adaptively locate a minimum cutoff frequency by curve fitting and attenuate related frequency components to a lower magnitude; and
   performing ghost artifact reduction on the video signal to generate the improved video signal.

2. The method of claim 1 wherein performing ghost artifact reduction on the video signal includes determining locations and magnitudes of pre-ghosts and post-ghosts.

3. The method of claim 2 wherein performing ghost artifact reduction on the video signal includes edge correlation.

4. The method of claim 1 wherein performing ghost artifact reduction on the video signal utilizes an infinite impulse response filter.

5. The method of claim 1 wherein performing ghost artifact reduction on the video signal includes spline interpolation for subpixel accuracy.

6. An apparatus comprising:
   a non-transitory memory for storing an application, the application for:
      receiving a video signal;
      performing Y/C artifact reduction on the video signal to generate an improved video signal; and
      performing ghost artifact reduction on the video signal to generate the improved video signal, wherein performing Y/C artifact reduction on the video signal includes utilizing a notch filter on the chroma signal of the video signal to target specific spike locations in the video signal, wherein performing Y/C artifact reduction on the video signal includes utilizing adaptive frequency suppression on the luma signal of the video signal to adaptively locate a minimum cutoff frequency by curve fitting and attenuate related frequency components to a lower magnitude; and
   a processor coupled to the memory, the processor configured for processing the application.

7. The apparatus of claim 6 wherein performing ghost artifact reduction on the video signal includes determining locations and magnitudes of pre-ghosts and post-ghosts.

8. The apparatus of claim 7 wherein performing ghost artifact reduction on the video signal includes edge correlation.

9. The apparatus of claim 6 wherein performing ghost artifact reduction on the video signal utilizes an infinite impulse response filter.

10. The apparatus of claim 6 wherein performing ghost artifact reduction on the video signal includes spline interpolation for subpixel accuracy.

11. A system comprising:
    one or more devices for receiving a video signal; and
    one or more filters for:
       performing Y/C artifact reduction on the video signal to generate an improved video signal; and
       performing ghost artifact reduction on the video signal to generate the improved video signal, wherein performing Y/C artifact reduction on the video signal includes utilizing a notch filter on the chroma signal of the video signal to target specific spike locations in the video signal, wherein performing Y/C artifact reduction on the video signal includes utilizing adaptive frequency suppression on the luma signal of the video signal to adaptively locate a minimum cutoff frequency by curve fitting and attenuate related frequency components to a lower magnitude.

12. The system of claim 11 wherein performing ghost artifact reduction on the video signal includes determining locations and magnitudes of pre-ghosts and post-ghosts.

13. The system of claim 12 wherein performing ghost artifact reduction on the video signal includes edge correlation.

14. The system of claim 11 wherein performing ghost artifact reduction on the video signal utilizes an infinite impulse response filter.

15. The system of claim 11 wherein performing ghost artifact reduction on the video signal includes spline interpolation for subpixel accuracy.

* * * * *